(12) United States Patent
Whitling et al.

(10) Patent No.: US 8,002,491 B2
(45) Date of Patent: Aug. 23, 2011

(54) SMALL HANDLING POLE LOCKING ASSEMBLY

(75) Inventors: Robert Whitling, Morgan Hill, CA (US); Gregory Francisco, Glencoe, CA (US); William Dale Jones, Phoenix, AZ (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 631 days.

(21) Appl. No.: 12/056,711

(22) Filed: Mar. 27, 2008

(65) Prior Publication Data

US 2009/0242065 A1 Oct. 1, 2009

(51) Int. Cl.
*G21C 19/00* (2006.01)
(52) U.S. Cl. .............. 403/349; 403/316; 403/379.2; 376/260; 16/429
(58) Field of Classification Search ........... 16/427, 16/429, DIG. 41
See application file for complete search history.

(56) References Cited

U.S. PATENT DOCUMENTS

| | | | | |
|---|---|---|---|---|
| 2,049,289 A * | 7/1936 | Burns et al. | ............... | 464/21 |
| 2,076,918 A * | 4/1937 | Robison | ............... | 285/82 |
| 2,328,988 A * | 9/1943 | Martin | ............... | 403/318 |
| 3,854,832 A * | 12/1974 | Cowper | ............... | 403/349 |
| 4,518,162 A * | 5/1985 | Oates | ............... | 482/93 |
| 5,094,464 A * | 3/1992 | Musacchia, Sr. | ............... | 473/582 |
| 5,253,716 A * | 10/1993 | Mitchell | ............... | 169/70 |
| 5,490,369 A * | 2/1996 | Ellis et al. | ............... | 53/317 |
| 5,513,622 A * | 5/1996 | Musacchia, Sr. | ............... | 124/89 |
| 5,924,658 A * | 7/1999 | Shiery et al. | ............... | 248/125.8 |
| 6,126,359 A * | 10/2000 | Dittrich et al. | ............... | 403/349 |
| 6,254,303 B1 * | 7/2001 | Falat et al. | ............... | 403/348 |
| 6,494,636 B1 * | 12/2002 | Mozena | ............... | 403/109.2 |
| 6,726,393 B2 * | 4/2004 | Tsai et al. | ............... | 403/109.4 |
| 7,787,583 B2 * | 8/2010 | Francisco et al. | ............... | 376/260 |
| 2003/0192187 A1 * | 10/2003 | Bean | ............... | 30/164.6 |
| 2003/0233718 A1 * | 12/2003 | Heathcock et al. | ............... | 15/144.4 |
| 2006/0288537 A1 * | 12/2006 | Francisco et al. | ............... | 16/429 |
| 2010/0014622 A1 * | 1/2010 | Francisco et al. | ............... | 376/260 |

* cited by examiner

*Primary Examiner* — Joshua T Kennedy
(74) *Attorney, Agent, or Firm* — Harness, Dickey & Pierce, P.L.C.

(57) ABSTRACT

A system and a method for securely connecting, or interlocking two pole sections together to ensure that they do not disconnect during use. The system includes a tubular female end portion of the first pole section and a male end portion of the second pole section that is insertable into the female end portion. The system additionally includes a locking nut threadingly engaged with the male end portion that is rotatable on the male end portion to longitudinally transition the locking nut into contact with the female end portion to fixedly interlock the male and female end portions. Furthermore, the system includes a biased locking sleeve assembly slidably and rotatably mounted on a locking assembly portion of the second pole. The locking sleeve assembly can include a locking sleeve and a biased plunger slidingly positioned within an interior of the locking sleeve for applying a locking force to the locking nut.

17 Claims, 6 Drawing Sheets

SMALL HANDLING POLE LOCKING ASSEMBLY

CROSS-REFERENCE TO RELATED APPLICATIONS

The present application is related in general subject matter to the following application, which is being filed concurrently with the present application, and is hereby incorporated by reference into the present application in its entirety, U.S. application Ser. No. 12/056,738, filed Mar. 27, 2008.

FIELD

The present teachings relate to systems and methods for securely connecting, or interlocking, two pole sections together such that they do not disconnect during use.

BACKGROUND

The statements in this section merely provide background information related to the present disclosure and may not constitute prior art.

Various industries incorporate the use of long poles to perform various operational, manufacturing, organizational, inspection and maintenance tasks. For convenience and flexibility, such poles are often constructed, or assembled, by connecting various length pole sections together to provide a pole of a specific length. Additionally, a tool or some other instrument or device is often connected to an end of the assembled pole to perform a desired task. In many instances the interconnection of the pole sections, and the interconnection of the tool and respective pole section, can incur substantial stress, vibration, shaking and/or rotational torque during use. Accordingly, it can be important that the interconnections be very secure to prevent loosening and/or separating of the sections and/or tool during use.

For example, high torque, sectional handling poles are often used by nuclear reactor service technicians to manipulate tools utilized for performing various service, inspection and repair tasks inside the reactor vessel. Frequently, during manipulation of the pole and tool within the reactor vessel, particularly when the technician applies a rotational torque to the pole, one or more coupling assemblies used to connect the pole sections and tool together loosen and often separate. When such separation of the pole sections and/or tool occur, the activities must be interrupted until the section or tool is retrieved.

SUMMARY

In various embodiments, a system for interlocking a first pole section to a second pole section are provided, wherein the system includes a tubular female end portion of the first pole section and a male end portion of the second pole section that is insertable into the female end portion. The system additionally includes a locking nut threadingly engaged with the male end portion that is rotatable on the male end portion to longitudinally transition the locking nut into contact with the female end portion to fixedly interlock the male and female end portions. Furthermore, the system includes a biased locking sleeve assembly slidably and rotatably mounted on a locking assembly portion of the second pole. The locking sleeve assembly can include a locking sleeve and a biased plunger slidingly positioned within an interior of the locking sleeve for applying a locking force to the locking nut.

In various other embodiments, a system for interlocking a first pole section to a second pole section is provided, wherein the system includes a tubular female end portion of the first pole section. The tubular female end portion includes a pair of opposing substantially J-shaped connecting slots. Each connecting slot includes a backbone section open at a distal end of the female end portion. The system additionally includes a male end portion of the second pole section having a connecting pin extending therethrough. The male end portion can be inserted into the female end portion such that opposing ends of the connecting pin are inserted into the backbone sections of the connecting slots and can be radially transitioned to a hook section of the respective connecting slots. The system further includes a locking nut threadingly engaged with the male end portion at a proximal end of the male end portion. The locking nut can be rotated to longitudinally transition the locking nut into contact with the female end portion such that the connecting pin ends are moved into the hook sections of the connecting slots to fixedly interlock the male end portion with the female end portion.

The system can still further includes a locking sleeve retaining pin extending through a locking sleeve assembly portion of the second pole between the locking nut and a proximal end of the locking sleeve assembly portion. Further yet, the system can include a biased locking sleeve assembly that is slidably and rotatably mounted on the locking sleeve assembly portion between the locking nut and the locking sleeve retaining pin. In various embodiments, the locking sleeve assembly can include a locking sleeve having a collar portion and neck portion, a plunger slidingly positioned within an interior of the collar portion, and a biasing device located within the interior of the collar portion, between the neck portion and the plunger, for forcing the plunger against the locking nut.

In yet other embodiments, a method for coupling a first pole section to a second pole section is provided, wherein the method includes inserting a tubular female end portion of the first pole section over a male end portion of the second pole section such that opposing ends of a connecting pin extending through the male end portion are inserted into backbone sections of opposing J-shaped connecting slots formed in the female end portion. Additionally, the method can include rotating at least one the male and female end portion relative to each other to radially transition the connecting pin ends to hook sections of the respective connecting slots. Furthermore, the method can include rotating a locking nut threadingly engaged with the male end portion at a proximal end of the male end portion to longitudinally transition the locking nut into contact with the female end portion, thereby moving the connecting pin ends into the hook sections to fixedly interlock the male end portion with the female end portion. Still further, the method can include longitudinally transitioning a biased locking sleeve assembly mounted on a locking sleeve assembly portion of the second pole toward the locking nut such that a biased plunger of the locking sleeve assembly exerts a locking force on the locking nut sufficient to prevent or considerably inhibit rotation of the locking nut and separation of the locking nut and female end portion. Further yet, the method can include rotating a locking sleeve of the locking sleeve assembly to engage a pair of locking slots radially located within an interior surface of a distal end portion of a neck portion of the locking sleeve with a locking sleeve retaining pin extending through the locking sleeve assembly portion, thereby locking the locking sleeve assembly in a 'Locked' position where the locking force exerted by the biased plunger is maintained on the locking nut.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

The following description is merely exemplary in nature and is in no way intended to limit the present teachings, application, or uses. Throughout this specification, like reference numerals will be used to refer to like elements.

Figure 1:
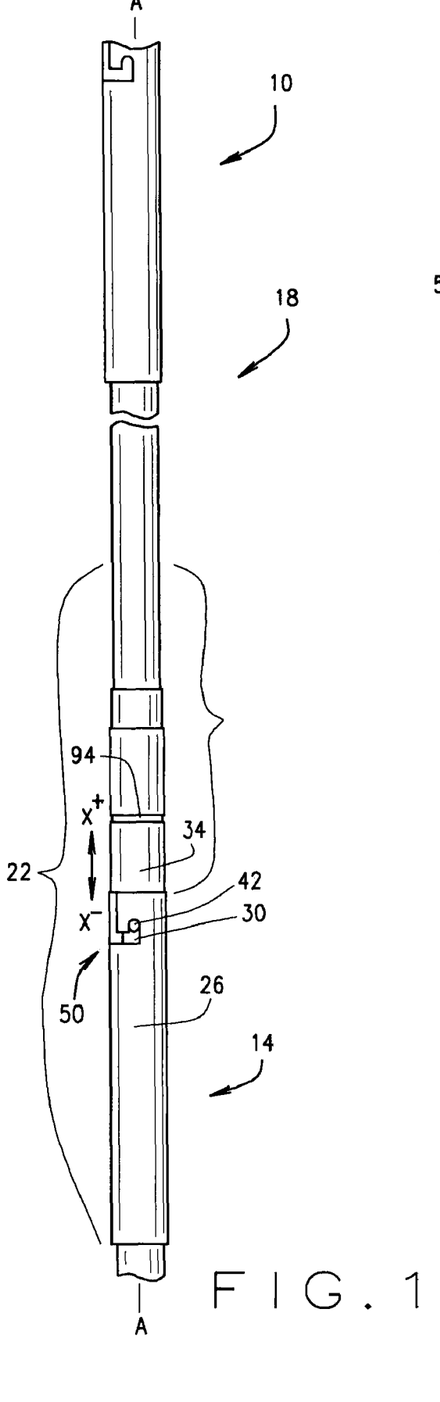
FIG. 1 is an illustration of a segment of a sectional handling pole including adjacent pole sections interlocked together utilizing a coupling system, in accordance with various embodiments of the present disclosure.
Figure 1A:
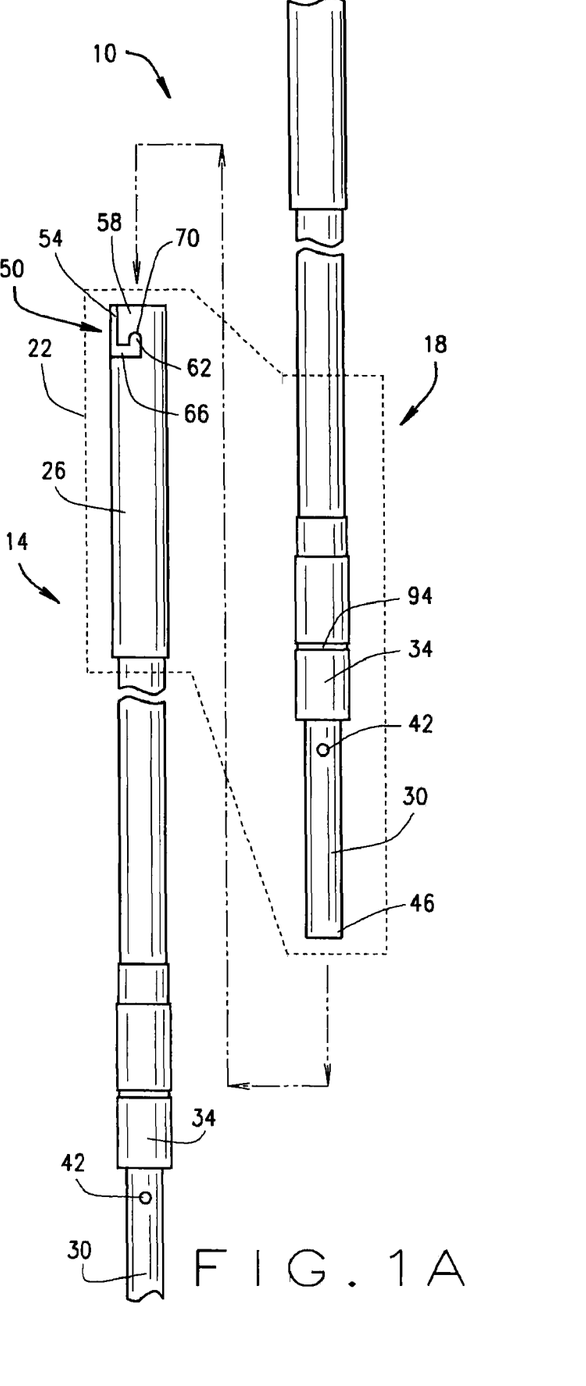
FIG. 1A is an illustration of the handling pole shown in FIG. 1 having the adjacent pole sections separated, in accordance with various embodiments of the present disclosure.

Referring to FIGS. 1 and 1A, an exemplary illustration of a sectional handling pole 10 is provided. The handling pole 10 can be implemented to perform various operational, manufacturing, organizational, inspection and maintenance tasks where it is inconvenient or unfeasible for the task to be performed by a person in close proximity to the equipment, system, apparatus, device, component, etc., on which the task is to be preformed. For example, in various embodiments, the sectional handling pole 10 can be utilized by nuclear reactor service technicians to manipulate tools used for performing various service, inspection and repair tasks inside the reactor vessel.

Generally, the handling pole 10 includes a first pole section 14 coupled together with a second pole section 18 utilizing a coupling system 22. The first and second pole sections 14 and 18 are generally the same in that they each comprise the same parts, components and structure, as described below. However, the first and second pole sections 14 and 18 are merely exemplary illustrations of two of a plurality of substantially similar pole sections that can be coupled together to construct, or assemble, the handling pole 10. That is, it should be understood that the first and second pole sections 14 and 18 can be of the same or different lengths, and that the handling pole 10 can comprise more pole sections than the first and second pole sections 14 and 18 exemplarily illustrated. Thus, the handling pole 10 can be constructed, or assembled, to have any desired length by coupling together two or more pole sections of desired lengths, e.g., first and second pole sections 14 and 18, using the coupling system 22, as described herein.

Figure 2:
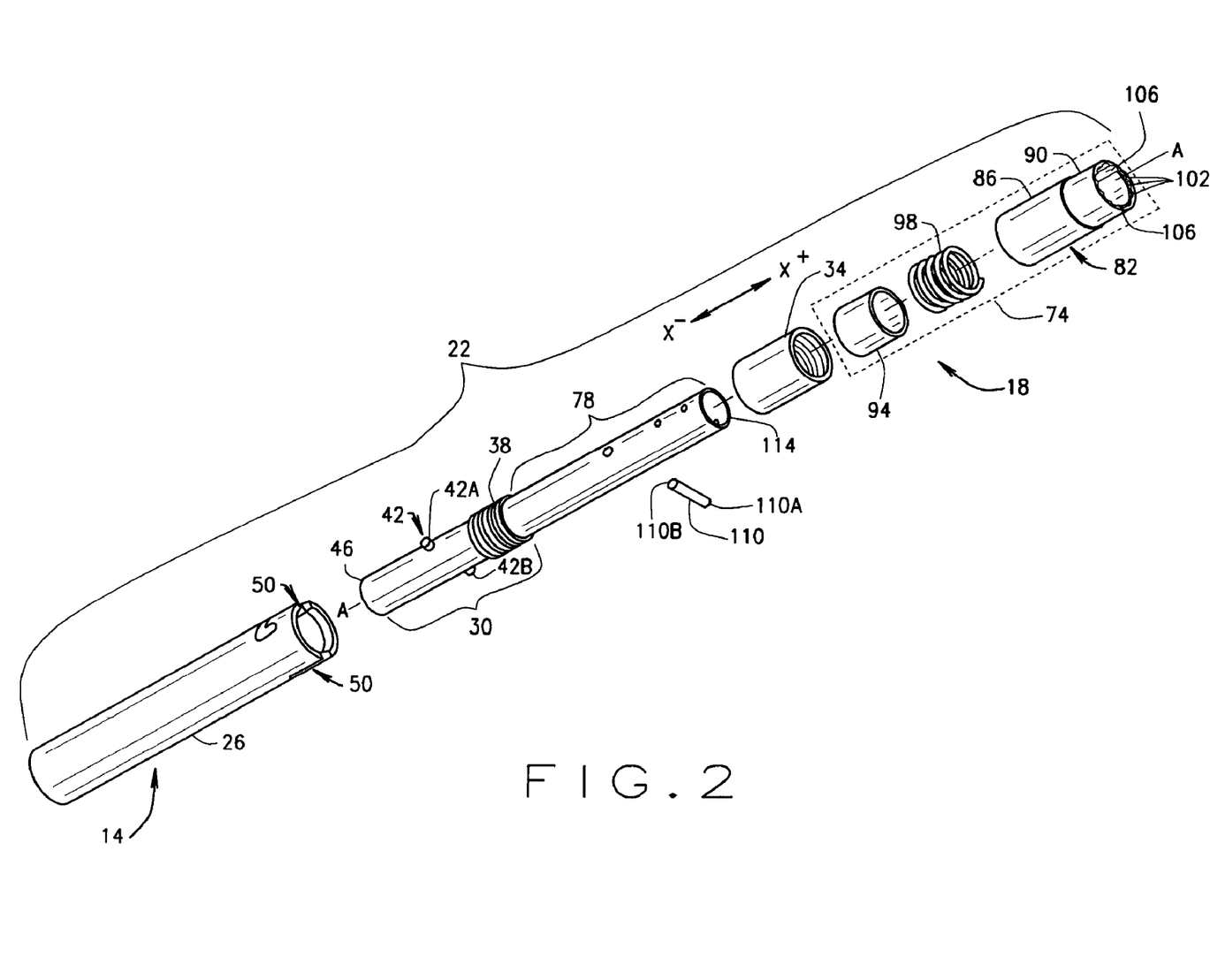
FIG. 2 is an exploded view of the handling pole shown in FIG. 1, in accordance with various embodiments of the present disclosure.

Referring now to FIGS. 1, 1A and 2, in various embodiments, the coupling system 22 includes a tubular female end portion 26 of the first pole section 14 and a male end portion 30 of the second pole section 18. An inner diameter of the tubular female end portion 26 is sized to be substantially equal to an outer diameter of the male end portion 30. Therefore, the male end portion 30 can be inserted into the female end portion 26 with very little play, slop, gap or space between male end portion outer diameter and the female end portion inner diameter. Accordingly, the male end portion 30 fits snuggly within the female end portion 26 such that the first and second pole sections 14 and 18 become a substantially steady, or stable, extension of each other.

Figure 4A:
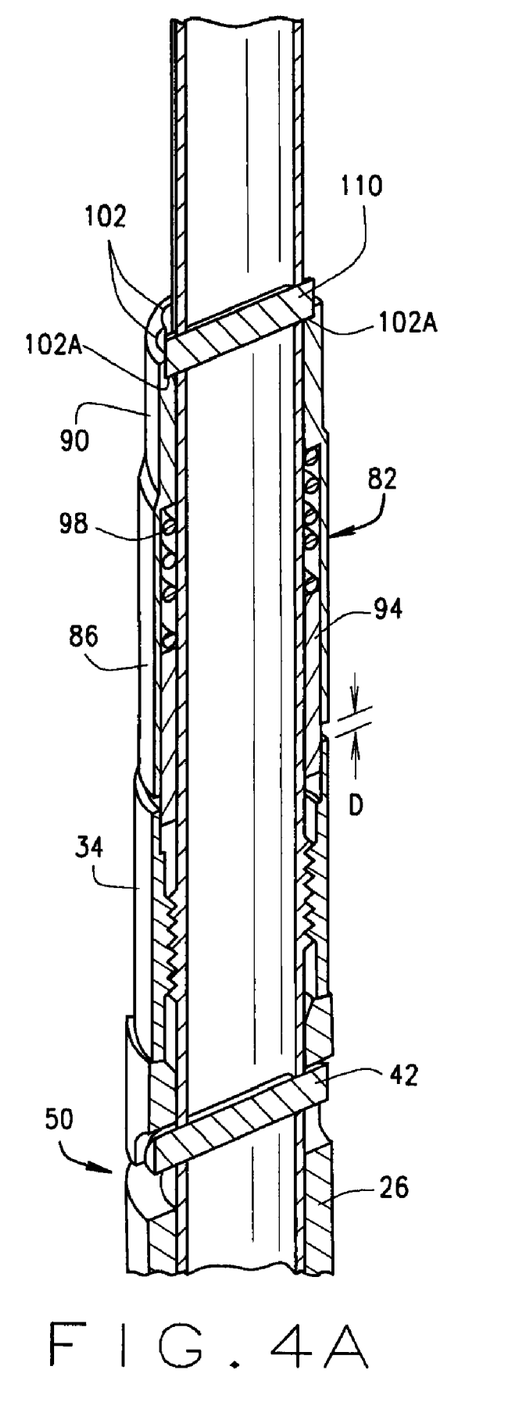
FIG. 4A is a sectional view of a portion of the sectional handling pole shown in FIG. 1, illustrating the locking sleeve assembly shown in FIG. 3 in a 'Locked' position, in accordance with various embodiments of the present disclosure.

Additionally, in various forms, the coupling system 22 includes a locking nut 34 threadingly engaged with threads 38 formed on the male end portion 30. The locking nut 34 can be rotatated about the male end portion 30 to longitudinally transition the locking nut 34 along an axis A of the male end portion 30 in the $X^+$ and $X^-$ directions. For instance, once the male end portion 30 is inserted into the female end portion 36, the locking nut 34 can be rotated to longitudinally transition the locking nut 34 in the $X^-$ direction and into contact with the female end portion 26 (as shown in FIG. 4A) to fixedly couple the male end portion 30 with the female end portion 26.

More particularly, in various embodiments, the male end portion 30 includes a connecting pin 42 that extends laterally through male end portion 30 between the threads 38 and a distal end 46 of the male end portion 30. Additionally, the female end portion 26 includes a pair of opposing substantially J-shaped connecting slots 50. As best shown in FIG. 1A, each of the J-shaped connecting slots 50 includes a backbone section 54 that is open at a distal end 58 of the female end portion 26, a hook section 62 and a bottom section 66 that connects the backbone section 54 with the hook section 62. In such embodiments, when the male end portion 30 is inserted into the female end portion 26, opposing ends 42A and 42B are inserted into the backbone section 54 of a respective J-shaped connecting slot 50. The first pole section 14 and/or the second pole section 18 can then be rotated relative to the other to transition the connecting pin ends 42A and 42B from the backbone sections 54 to the hook sections 62, via the bottom sections 66.

The locking nut 34 can then be rotated about the threads 38 to longitudinally transition, or move, the locking nut 34 in the $X^-$ direction and into contact with the distal end 58 of the female end portion 26. Further rotation of the locking nut 34 will move the female end portion 26 in the $X^-$ direction drawing the locking pin ends 42A and 42B into the hook sections 62 until the locking pin ends 42A and 42B are drawn firmly and tightly into distal ends 70 of the hook sections 62. When the locking pin ends 42A and 42B are drawn firmly and tightly into distal ends 70 of the hook sections 62, the female and male end portions 26 and 30, and more particularly, the first and second pole sections 14 and 18, are fixedly coupled, or interlocked, together.

Figure 3:
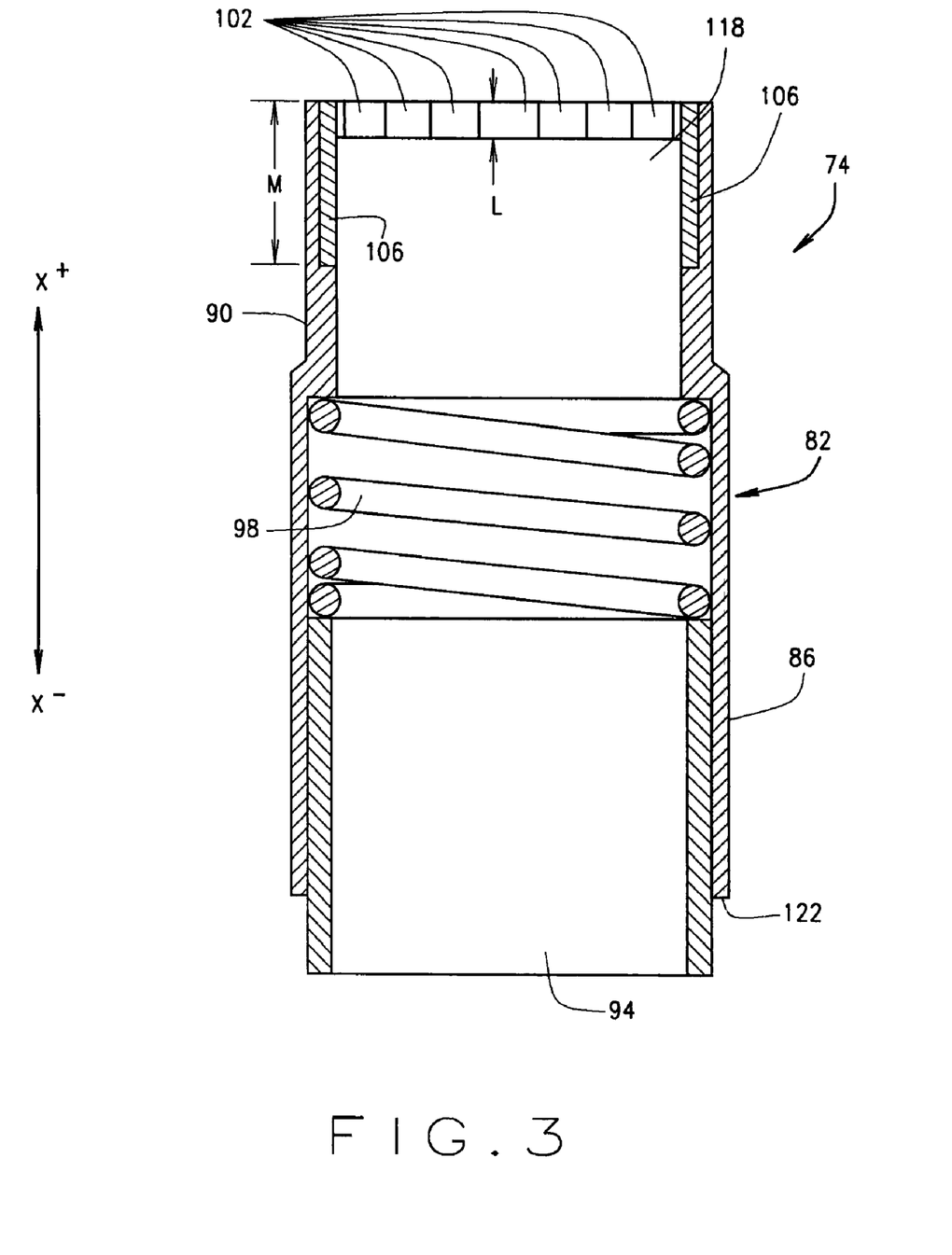
FIG. 3 is a sectional view of a locking sleeve assembly included in the sectional handling pole shown in FIG. 1, in accordance with various embodiments of the present disclosure.

Referring to FIGS. 2 and 3, in various embodiments, the coupling system 22 further includes a biased locking sleeve assembly 74 (best shown in FIG. 2) that is slidably and rotatably mounted on a locking assembly portion 78 of the second pole 18. In various implementations, the locking sleeve assembly 74 includes a locking sleeve 82 having a collar portion 86 and neck portion 90, a plunger 94 slidingly positioned within an interior of the locking sleeve collar portion 86, and a biasing device 98 located within the interior of the collar portion 86, between the neck portion 90 and the plunger 94. Although illustrated as a spring, the basing device 98 can be any biasing device such as a spring, resilient bushing or any other device suitable for exerting a force on the plunger in the $X^-$ direction to force the plunger 94 against the locking nut 34.

Figure 4B:
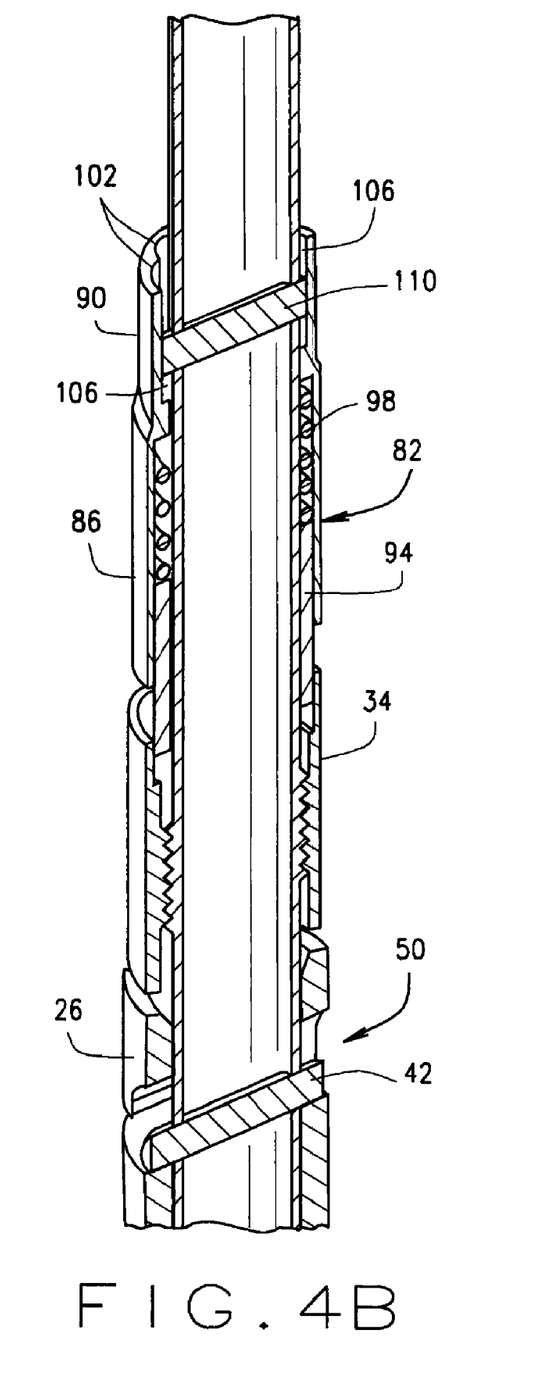
FIG. 4B is a sectional view of a portion of the sectional handling pole shown in FIG. 1, illustrating the locking sleeve assembly shown in FIG. 3 in a 'Unlocked' position, in accordance with various embodiments of the present disclosure.

Referring now to FIGS. 2, 3, 4A and 4B, as described in detail below, the locking sleeve 82 includes a plurality of locking slots 102 and a pair of retraction slots 106 formed along an interior surface of the locking sleeve neck portion 90. The locking slots 102 and retraction slots 106 are structured to engage a locking sleeve retaining pin 110 extending through the locking sleeve assembly portion 78 between the locking nut 34 and a proximal end 114 of the locking sleeve assembly portion 78. Particularly, the locking sleeve assembly 74 is operable such that opposing ends 110A and 110B of the locking sleeve retaining pin 110 are engaged with an opposing pair of the locking slots 102 to place the locking sleeve assembly 74 in a 'Locked' position (FIG. 4A) and engaged with the retraction slots 106 to place the locking sleeve assembly 74 in an 'Unlocked' position (FIG. 4B).

More particularly, as best shown in FIG. 3, the locking slots 102 comprise short slots radially located within an interior surface of a distal end portion 118 of the locking sleeve neck portion 90. The locking slots 102 are sized to receive the ends 110A and 110B of the locking sleeve retaining pin 110 and have a length L sufficient to securely retain the locking sleeve retaining pin ends 110A and 110B when the biasing force of the biasing device 98 is exerted on the locking sleeve 82 in the $X^+$ direction.

To place the locking sleeve 82 in the 'Locked' position, once the locking nut 34 has been rotatingly transitioned in the $X^-$ direction to securely couple the first and second pole sections 14 and 18 together, as described above, a force is applied to the locking sleeve 82 in the $X^-$ direction sufficient to overcome the biasing force of the biasing device 98, thereby longitudinally transitioning the locking sleeve 82 in the $X^-$ direction. Specifically, force is applied, e.g., hand applied force, to the locking sleeve 82 sufficient to transition the locking sleeve 82 in the $X^-$ direction a sufficient distance to disengage, i.e., separate, the locking sleeve retaining pin ends 110A and 110B from the distal end portion 118 of the locking sleeve neck portion 90. More particularly, the locking sleeve 82 is transitioned in the $X^-$ direction a sufficient distance to disengage the locking sleeve retaining pin ends 110A and 110B from the retraction slots 106.

The locking sleeve 82 can then be rotated about the second pole locking sleeve assembly portion 78 to align the locking sleeve retaining pin ends 110A and 110B with any opposing set of locking slots 102. Once the locking sleeve retaining pin ends 110A and 110B are aligned with a set of opposing locking slots 102, the force being applied to locking sleeve 82 in the $X^-$ direction can be removed, such that force exerted by the biasing device 98 will move the locking sleeve 82 in the $X^+$ direction and force the locking sleeve retaining pin ends 110A and 110B into contact with bottom surfaces 102A of the respective opposing locking slots 102. Once the locking sleeve retaining pin ends 110A and 110B contact the bottom surfaces 102A, the locking sleeve 82 is prevented from moving further in the $X^+$ direction, thereby securely engaging the locking sleeve retaining pin ends 110A and 110B within the locking slots 102, thereby placing the locking sleeve 82 in the 'Locked' position.

When in the 'Locked' position, the biasing device 98 is compressed to exert a locking load, or force, on the plunger 94 that, in turn, exerts the locking load, or force, on the locking nut 34. More particularly, the biasing device 98 is structured to provide a locking load, or force, sufficient to prevent or considerably inhibit rotation of the locking nut 34 and any resulting separation of the locking nut 34 from the female end portion 26. For example, in various embodiments, the biasing device 98 is structured to exert between approximately 30 and 50 lbs/in of force on the locking nut 34, e.g., approximately 40 lbs/in, when the locking sleeve 82 is in the 'Locked' position. Additionally, as described below, the resulting gap 'D' between the locking sleeve 82 and the locking nut 34 is less than a distance needed to disengage the connecting pin 42 from the J-shaped connections slots 50, thereby further preventing the possibility of the first and second pole sections 14 and 18 separating.

With further reference to FIG. 3, the retraction slots 106 comprise a pair of opposing slots located within the interior surface of the distal end portion 118 of the locking sleeve neck portion 90. As with the locking slots 102, the retraction slots 106 are also sized to receive the ends 110A and 110B of the locking sleeve retaining pin 110. Additionally, the retraction slots 106 have a length M that is considerably longer in the axial direction than the length L of the locking slots 102. The length M of the retraction slots 106 is sufficient to allow the locking sleeve 82 to be transitioned in the $X^+$ direction a distance sufficient to remove the locking force applied to the locking nut 34 by the plunger 94 and biasing device 98. Particularly, removing the locking force allows the locking sleeve 82 to longitudinally transition in the $X^+$ direction a sufficient distance from the locking nut 34 to allow the locking nut 34 to be unthreaded, i.e., rotated to longitudinally transition in the $X^+$ direction, to allow the connecting pin 42 to be removed from the connecting slots 50 and the male end portion 30 separated from the female end portion 26.

It should be understood that when the locking sleeve 82 is placed in the 'Unlocked' position the force applied on the locking nut 34 by the plunger 94 and biasing device 98 may or may not be completely removed. However, during unthreading of the locking nut 34, the spring may be slightly compressed to exert some force. However, this force will be considerably less than the locking force and is easily overcome. Therefore, the locking nut 34 can be rotated to transition the locking nut 34 in the $X^+$ direction, thereby allowing the connection pin ends 42A and 42B to be removed from the respective J-shaped slots 50 such that the male and female end portions 30 and 26 can be separated.

Thus, to place the locking sleeve 82 in the 'Unlocked' position, a force is applied to the locking sleeve 82 in the $X^-$ direction sufficient to overcome the locking force being exerted by the biasing device 98. The locking sleeve 82 is then longitudinally transitioned in the $X^-$ direction a sufficient distance to disengage the locking sleeve retaining pin ends 110A and 110B from the locking slots 102. The locking sleeve 82 can then be rotated about the locking sleeve portion of the second pole to align the retraction slots 106 with the locking sleeve retaining pin ends 110A and 110B. Once the retraction slots 106 are aligned with the locking sleeve retaining pin ends 110A and 110B, the force of the biasing device 98 can be allowed to transition the locking sleeve 82 in the $X^+$ direction a distance substantially equal to the length M of the retraction slots 106, thereby placing the locking sleeve 82 in the 'Unlocked' position.

As described above, when the locking assembly 74 is in the 'Unlocked' position, the locking force applied by the plunger 94 and compressed biasing device 98 is removed. Once the locking force is removed, the locking nut 34 can be rotated and longitudinally transitioned in the X⁺ direction a distance sufficient to allow the connection pin ends 42A and 42B to be removed from the respective J-shaped slots 50 and the first pole section 14 separated from the second pole section 18.

As illustrated in FIG. 3, the length M of the retraction slots 106 is significantly longer than the length L of the locking slots 102. In various embodiments, the length M of the retraction slots 106 is approximately 5 to 25 times longer than the length L of the locking slots 102, e.g., 15 times longer than the length L of the locking slots 102. For example, in various configurations, the length L of the locking slots 102 can be approximately $1/16^{th}$ of an inch and the length M of the retraction slots 106 can be approximately 1 to 2 inches.

Referring particularly to FIG. 4A, as described above, in various embodiments the length L of the locking slots 102 are sized to position a distal end 122 of the locking sleeve collar portion 86 a particular distance D from the locking nut 34 when the locking sleeve assembly 74 is in the 'Locked' position. More specifically, the distance D is specifically sized such that, should the locking nut 34 back-off during use of the sectional handling pole 10, the locking nut 34 will only be allowed to longitudinally transition in the X⁺ direction the specific distance D. Still more particularly, the distance D is calculated such that should the locking nut 34 back-off the distance D, the locking nut 34 will abut the distal end 122 of the locking sleeve collar portion 86, thereby preventing the locking nut 34 from longitudinally transitioning a distance in the X⁺ direction sufficient to allow the connecting pin ends 42A and 42B to move out of the hook sections 62 of the J-shaped slots 50. Therefore, once the locking sleeve assembly 74 is placed in the 'Locked' position, should the locking nut 34 back-off during use of the sectional handling pole 10, separation of the male and female end portions 30 and 26 will be prevented because the locking nut 34 is only allowed to move the distance D in the X⁺ direction. The distance D is insufficient to allow the connecting pin ends 42A and 42B to disengage with the J-shaped slots 50. For example, in various embodiments, disengagement of the connecting pin ends 42A and 42B from the J-shaped slots 50 can require approximately ¼ of an inch travel in the X⁻ directions, and the distance D can be approximately $1/10^{th}$ of an inch to $1/8^{th}$ of an inch.

Figure 5:
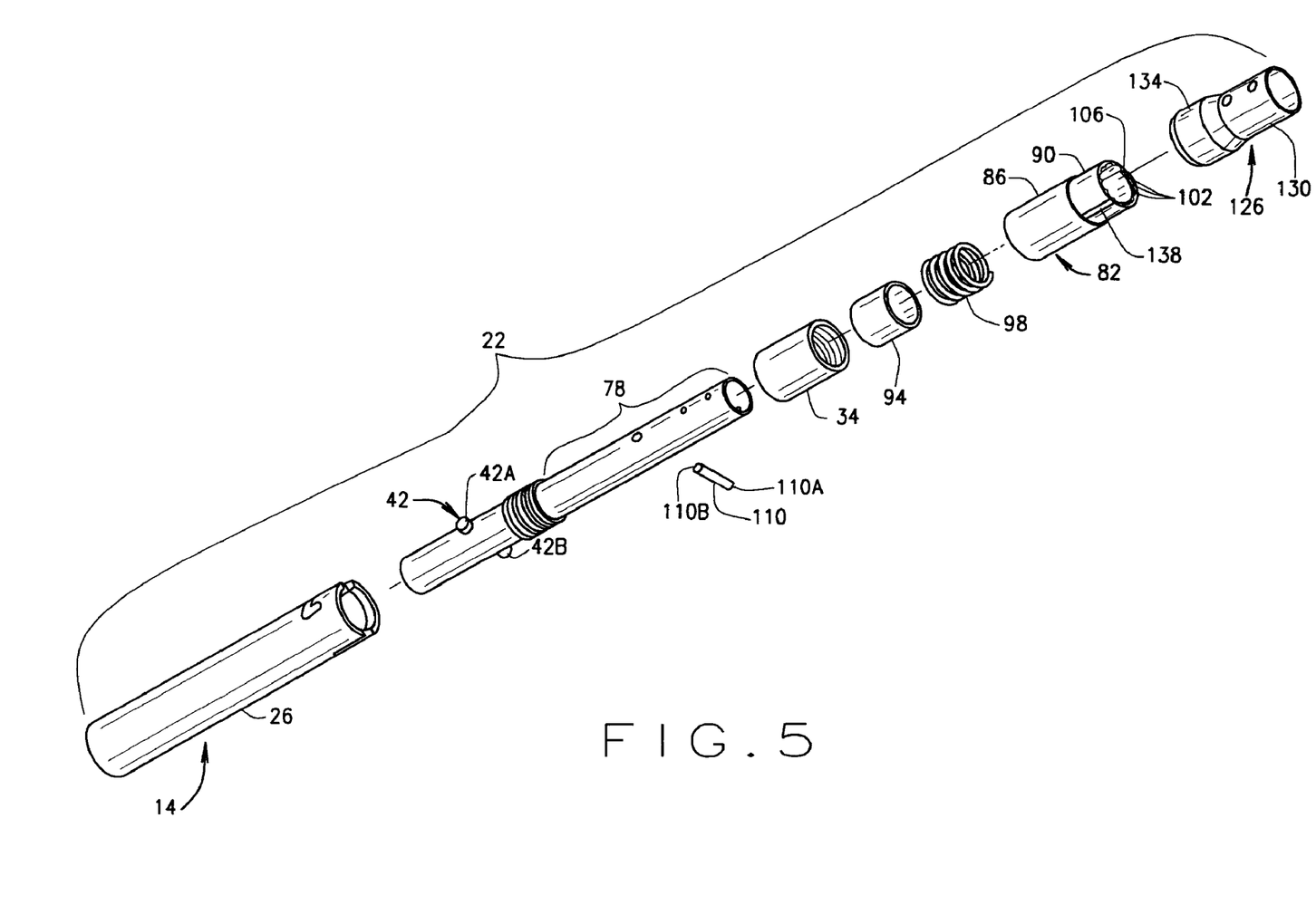
FIG. 5 is an exploded view of the handling pole shown in FIG. 1 including a protection sleeve, in accordance with various embodiments of the present disclosure.

Referring now to FIG. 5, in various embodiments, the coupling system 22 additionally includes a protection sleeve 126 mounted on the locking sleeve assembly portion 78. The protection sleeve 126 includes a body 130 for mounting the protection sleeve 126 on the locking sleeve assembly portion 78, and a protective hood 134 that extends over the locking sleeve retaining pin ends 110A and 110B. Thus, the protective hood 134 covers the locking sleeve retaining pin ends 110A and 110B protecting them from damage. Additionally, the protective hood 134 is sized to receive the locking sleeve neck portion 90 and cover at least the distal end portion 118 of the locking sleeve neck portion 90. Therefore, the protective hood 134 covers and protects the locking slots 102 and retraction slots 106. In various embodiments wherein the protective hood 134 covers and protects the locking slots 102 and retraction slots 106, the neck portion 90 of the locking sleeve 82 includes an alignment indicator 138 on an exterior surface of the neck portion 90. The alignment indicator 138 can by any indicator suitable to indicate the location of the retraction slots 106 formed in the interior surface of the neck portion 90. For example, in various embodiments the alignment indicator can be a colored mark and embossed arrow, a recessed line or any other suitable indicator.

Figure 6:
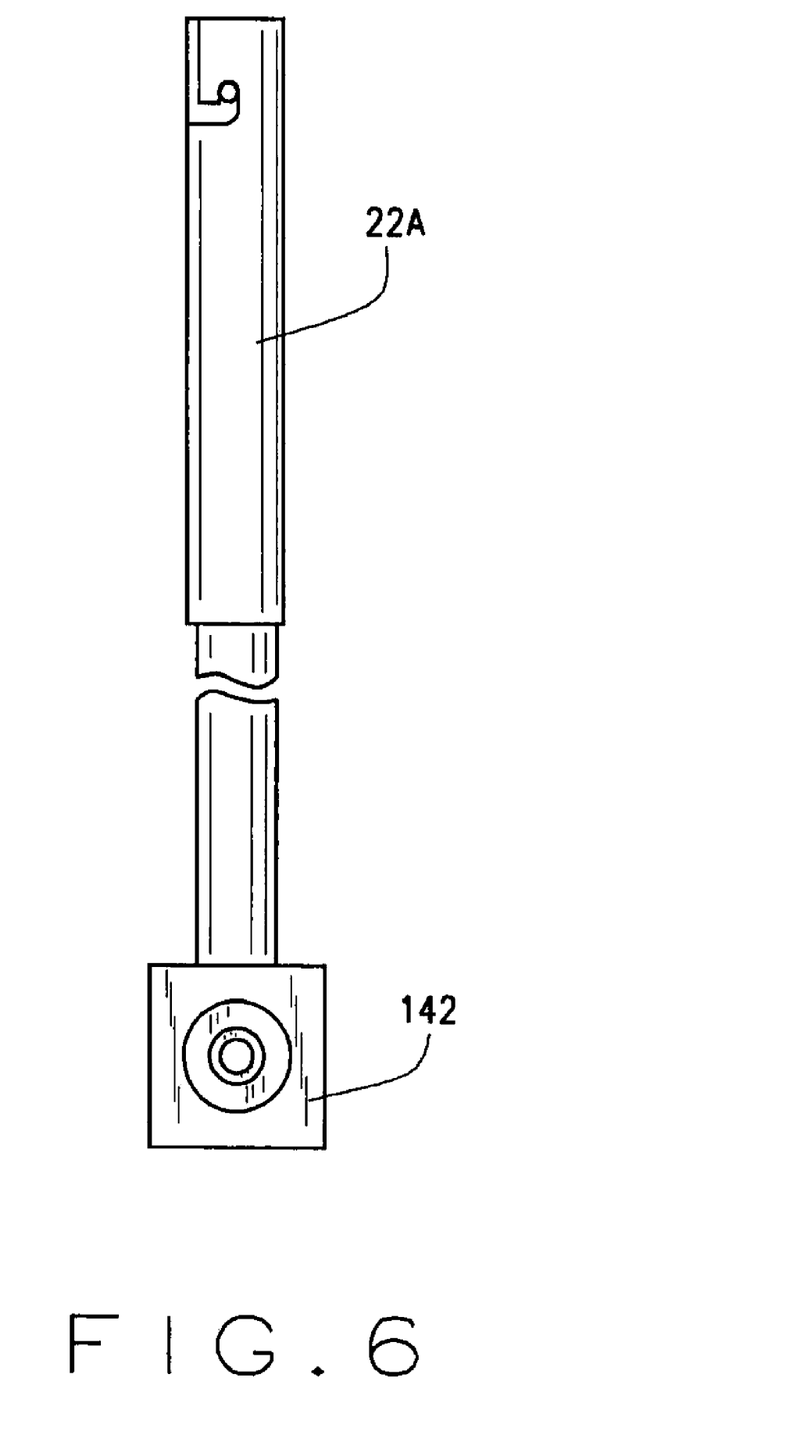
FIG. 6 is an illustration of a portion of the sectional handling pole shown in FIG. 1, having a tool connected thereto utilizing the coupling system shown in FIG. 1, in accordance with various embodiments of the present disclosure.

Referring now to FIG. 6, it should be understood that although the coupling system 22 has been described herein as being structured and operable to connect two or more pole sections, e.g., the first and second pole sections 14 and 18, the couple system 22 can further be implemented to connect a tool 142 to any pole section. More particularly, the tool 142 can be connected to a tubular female end portion 26A that is identical in form, structure and function as the tubular female end portion 26 described above. Accordingly, the tool 142 can be coupled to the male end portion 30 of any pole section utilizing the coupling system 22 as described above with regard to the first and second pole sections 14 and 18. The tool 142 can be any tool, instrument or device for performing a desired task utilizing the handling pole 10 having poles sections coupled together and/or tools coupled to a pole section utilizing the coupling system 22 described herein.

It will be understood that, although the terms first, second, third, etc., may be used herein to describe various elements, components and/or sections, these elements, components and/or sections should not be limited by these terms. These terms may be only used to distinguish one element, component or section from another element, component or section. Thus, a first element, component or section discussed below could be termed a second element, component or section without departing from the teachings of the example embodiments.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A system comprising:
   a first pole section;
   a second pole section coupled to the first pole section;
   a tubular female end portion on an end of the first pole section and including a pair of connecting slots;
   a male end portion on an end of the second pole section, the male end portion insertable into the female end portion and having a connecting pin extending therethrough, opposing ends of the connecting pin insertable into the connecting slots and radially transitionable to a hook section of the respective connecting slots;
   a locking nut threadingly engaged with the male end portion, the locking nut rotatable to longitudinally transition the locking nut into contact with the female end portion to retain the connecting pins in the hook section of the respective connecting slots to fixedly couple the male end portion with the female end portion; and
   a biased locking sleeve assembly slidably and rotatably mounted on a locking assembly portion of the second pole, the locking sleeve assembly including, a locking sleeve having a collar portion and neck portion;
a plunger slidingly positioned within an interior of the collar portion; and
a biasing device located within the interior of the collar portion, between the neck portion and the plunger, for forcing the plunger against the locking nut to prevent rotation thereof,
the neck portion including at least one retraction slot selectively engageable with a locking sleeve retaining pin on the second pole section to place the locking sleeve in an unlocked position and allow rotation of the locking nut.

2. The system of claim 1, wherein,
the locking sleeve neck portion comprises a plurality of locking slots engageable with a locking sleeve retaining pin extending through the locking assembly portion to place the locking sleeve in a locked position, and
if the locking sleeve is in the locked position, the biasing device exerts a locking load on the locking nut, via the plunger, sufficient to inhibit rotation of the locking nut that would otherwise allow the locking nut to longitudinally transition away from the female end portion and allow the opposing ends of the connecting pin to radially transition from the hook section to a backbone section of the connecting slots to allow separation of the male and female end portions.

3. The system of claim 2,
wherein the load on the locking nut, via the biasing device and plunger, is reduced to allow rotation of the locking nut and separation of the male and female end portions, when the locking sleeve is in the unlocked position.

4. The system of claim 3, wherein the locking slots comprise slots radially located within an interior surface of a distal end portion of the locking sleeve neck portion and the locking sleeve retaining pin extends through the locking assembly portion such that opposing ends of the retaining pin are insertable into the locking slots to retain the locking sleeve in the locked position.

5. The system of claim 4, wherein the retraction slots comprise a pair of opposing slots formed in the interior surface of the distal end portion of the locking sleeve neck portion such that the opposing ends of the retaining pin are insertable into the retraction slots to retain the locking sleeve in the unlocked position, the retraction slots having a greater longitudinal length than the locking slots.

6. The system of claim 5, further comprising:
a protection sleeve mounted on the locking assembly portion, the protection sleeve including a protective hood that extends over the retaining pin and is sized to receive the locking sleeve neck portion.

7. The system of claim 6, wherein the locking sleeve neck portion comprises an alignment indicator on an exterior surface of the neck portion indicative of the location of the retraction slots formed in the interior surface of the neck portion.

8. The system of claim 2, wherein the locking slots have a length sized to position a distal end of the locking sleeve collar portion in close proximity to the locking nut when the locking sleeve is in the locked position such that when the locking nut is rotated to longitudinally transition the locking nut toward the locking sleeve, the locking nut will abut the distal end of the locking sleeve collar portion preventing the locking nut from longitudinally transitioning a sufficient distance to allow separation of the male and female end portions.

9. A system comprising:
a first pole section;
a second pole section coupled to the first pole section;
a tubular female end portion on an end of the first pole section, the tubular female end portion including a pair of opposing substantially J-shaped connecting slots, each having a backbone section open at a distal end of the female end portion;
a male end portion on an end of the second pole section, the male end portion having a connecting pin extending therethrough, the male end portion insertable into the female end portion such that opposing ends of the connecting pin are insertable into the backbone sections of the connecting slots and radially transitionable to a hook section of the respective connecting slots;
a locking nut threadingly engaged with the male end portion at a proximal end of the male end portion, the locking nut rotatable to longitudinally transition the locking nut into contact with the female end portion such that the connecting pin ends are retained in the hook sections of the connecting slots to fixedly interlock the male end portion with the female end portion;
a locking sleeve retaining pin extending through a locking sleeve assembly portion of the second pole between the locking nut and a proximal end of the locking sleeve assembly portion; and
a biased locking sleeve assembly slidably and rotatably mounted on the locking sleeve assembly portion between the locking nut and the locking sleeve retaining pin, the locking sleeve assembly including,
a locking sleeve having a collar portion and neck portion;
a plunger slidingly positioned within an interior of the collar portion; and
a biasing device located within the interior of the collar portion, between the neck portion and the plunger, for forcing the plunger against the locking nut to prevent rotation thereof,
the neck portion including at least one retraction slot selectively engageable with a locking sleeve retaining pin on the second pole section to place the locking sleeve in an unlocked position and allow rotation of the locking nut.

10. The system of claim 9, wherein the locking sleeve neck portion comprises a plurality of locking slots engageable with the locking sleeve retaining pin to place the locking sleeve in a locked position, and
wherein the biasing device exerts a locking load on the locking nut, via the plunger, sufficient to prevent or considerably inhibit rotation of the locking nut and separation of the locking nut and female end portion when the locking nut has been transitioned into contact with the female end portion and moved the connecting pin into the hook sections of the connecting slots, when the locking sleeve is in the locked position.

11. The system of claim 10, wherein the load on the locking nut, via the biasing device and plunger, is reduced to allow rotation of the locking nut and separation of the male and female end portions, when the locking sleeve is in the unlocked position.

12. The system of claim 11, wherein the locking slots comprise slots radially located within an interior surface of a distal end portion of the locking sleeve neck portion and the locking sleeve retaining pin extends through the locking sleeve assembly portion between the locking sleeve and locking sleeve assembly portion proximal end such that opposing ends of the retaining pin are insertable into the locking slots to retain the locking sleeve in the locked position.

13. The system of claim 12, wherein the retraction slots comprise a pair of opposing slots formed in the interior surface of the distal end portion of the locking sleeve neck portion such that the opposing ends of the retaining pin are insertable into the retraction slots to retain the locking sleeve in the unlocked position, the retraction slots having a greater longitudinal length than the locking slots.

14. The system of claim 13, further comprising a protection sleeve mounted on the locking sleeve assembly portion, the protection sleeve including a protective hood that extends over the retaining pin and is sized to receive the locking sleeve neck portion.

15. The system of claim 14, wherein the locking sleeve neck portion comprises an alignment indicator on an exterior surface of the neck portion indicative of the location of the retraction slots formed in the interior surface of the neck portion.

16. The system of claim 10, wherein the locking slots have a length sized to position a distal end of the locking sleeve collar portion in close proximity to the locking nut when the locking sleeve is in the locked position such that when the locking nut is rotated to longitudinally transition the locking nut toward the locking sleeve, the locking nut will abut the distal end of the locking sleeve collar portion preventing the locking nut from longitudinally transitioning a sufficient distance to allow the connecting pin ends from moving out of the hook sections, thereby preventing separation of the male and female end portions.

17. The system of claim 9, wherein the first pole section comprise a tool that includes the tubular female end portion for having the male end portion inserted therein to fixedly interlock the male end portion with the tool.

* * * * *